(12) United States Patent
Park

(10) Patent No.: US 6,287,355 B1
(45) Date of Patent: Sep. 11, 2001

(54) AIR FILTER FOR CARS HAVING SEPARATE INLET GUIDE TUBES AND A COMMON OUTLET COMMUNICATING WITH THE FILTER ELEMENTS

(75) Inventor: Kee-Youn Park, Chenlabuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/450,992

(22) Filed: Nov. 29, 1999

(30) Foreign Application Priority Data

Jan. 19, 1999 (KR) .................................................. 99-1356

(51) Int. Cl.⁷ ........................... B01D 29/52; B01D 35/30; F02B 77/00
(52) U.S. Cl. .......................... 55/419; 55/385.3; 55/476; 55/484; 123/198 E
(58) Field of Search .................... 55/385.3, 418, 55/419, 350.1, 476, 484; 123/198 E

(56) References Cited

U.S. PATENT DOCUMENTS 4,548,166 * 10/1985 Best ............................... 123/198 E
4,897,097 * 1/1990 Yamamura ............................. 55/419

\* cited by examiner

*Primary Examiner*—David A. Simmons
*Assistant Examiner*—Robert A. Hopkins
(74) *Attorney, Agent, or Firm*—Birch, Stewart, Kolasch & Birch, LLP

(57) ABSTRACT

An air filter for vehicles which includes a main body defining a chamber, a discharge outlet communicating with said chamber for discharging clean air therefrom, a disc-type baffle positioned to divide the chamber and the discharge outlet into two filtering zones, supporting and positioning plates spring-mounted to opposite sides of the disc-type baffle, said supporting and positioning plates having a smaller dimension than the chamber, an air inlet which branches into separate guide tubes which communicate with the two filtering zones of the chamber and filter elements mounted on each of said supporting and partitioning plates and spaced apart from the walls of the chamber within the filtering zones, said filter means defining an open center core for receiving air from said guide tubes.

4 Claims, 3 Drawing Sheets

AIR FILTER FOR CARS HAVING SEPARATE INLET GUIDE TUBES AND A COMMON OUTLET COMMUNICATING WITH THE FILTER ELEMENTS

BACKGROUND OF THE INVENTION

The present invention relates to an air filter for cars, and more particularly to an air filter for cars which is made to clean a larger quantity of air so as to be able to effectively feed the engine and improve the capacity thereof.

In general, in introducing air for burning fuel in a vehicle engine, an air filter is utilized for eliminating foreign material such as dust from the air in order to provide a car with clean air.

FIG. 1 shows a conventional air filter, in which an air flow inlet 2 for introducing air from the exterior is formed at one side of the main body 1. A discharge outlet 3 for discharging air to the engine is formed at another side of the main body.

A filter member 5 for eliminating foreign material is mounted within the interior of main body 1, and a supporting base 7 which supports the filter member 5 is coupled by a butterfly nut 8 to a supporting bracket 6 formed by projecting from the top center of the main body 1 to the bottom thereof. Accordingly, the filter member 5 is fixed to the interior of the main body 1.

A cap 4 for hermetically sealing the main body 1 is coupled to bottom of the main body 1, and this cap 4 is coupled by clamps 9 formed at both sides of the main body. A hermetically sealing rubber 9a is provided between the main body 1 and the cap 4.

In accordance with the operation of the thus constructed conventional air filter, exterior air flows into the device through the air flow inlet 2 where foreign material is eliminated as it passes through the filter member 5 and then the air in a cleaned state is fed to the engine through the discharging outlet 3. Accordingly, damage to the engine due to foreign material is prevented and the burning operation of the engine is smoothly and effectively maintained.

However, in accordance with the conventional air filter, since air is introduced through the air flow inlet of predetermined diameter and the air is fed to the engine by the sucking force of the engine, a large quantity of clean air cannot be introduced. Also, since the series of paths of filtered air discharged through the discharging outlet, after passing the filter member is almost the same, the situation can occur in which the filter member becomes partially polluted, whereby not only the exchanging term of the filter member becomes very short but also the quantity of air fed to the engine is reduced and therefore the capacity of engine is adversely affected.

Thus, it is advantageous for engine capacity improvement if air in a large quantity, as much as possible, can be supplied to the engine. However, in a conventional case, since the air passes concentrically around the body of air filter 5, at the part near the air inlet 2, a phenomenon occurs in which the filter member becomes locally clogged, thereby decreasing the quantity of air being discharged, which adversely influences the engine capacity.

SUMMARY OF THE INVENTION

Therefore, it is an object of the present invention to provide an air filter for vehicles in which air introduced into the air filter is evenly spread over the entire surface area of filter member thereby preventing the filter member from becoming locally polluted. Thus, a larger quantity of air can be cleaned and made available to feed to the engine so that the capacity of the engine can be improved.

In order to attain above object, the present invention provides an air filter which includes a cylindrical main body which is provided, on its circumferential surface with a discharging outlet for discharging clean air to the engine;

a guide tube for introducing air which has an air flow inlet for introducing air, said guide tube being branched from the air flow inlet and connected so as to communicate with the interior of the main body through both side surfaces of the main body;

a disc type baffle which is formed to be fixed to the center of the main body so as to divide the interior of main body including the discharging outlet into two parts;

a supporting and partitioning plate which is provided at a predetermined distance from both sides of the baffle, and having a smaller diameter than the inner diameter of the cylinder of the main body and provided so as to maintain concentricity with the cylinder of the main body;

springs which are contained in a compressed state between the baffle and the supporting and partitioning plate, with both ends of the springs being fixed to the baffle and the supporting and partitioning plate, respectively; and first and second filter members provided at the exterior of the supporting and partitioning plate and fixed to the supporting and partitioning plate, said filter members having a center core which communicates with the air flow inlet, the filter members are concentrically provided within the cylinder of main body where there are partitioned within the space formed between the inner wall surface to the main body.

BRIEF DESCRIPTION OF THE DRAWINGS

The present invention will become more fully understood from the detailed description given herein below and the accompanying drawings, which are given by way of illustration only, and thus are not limitative of the present invention, and wherein.

DETAILED DESCRIPTION OF PREFERRED EMBODIMENTS

Figure 1:
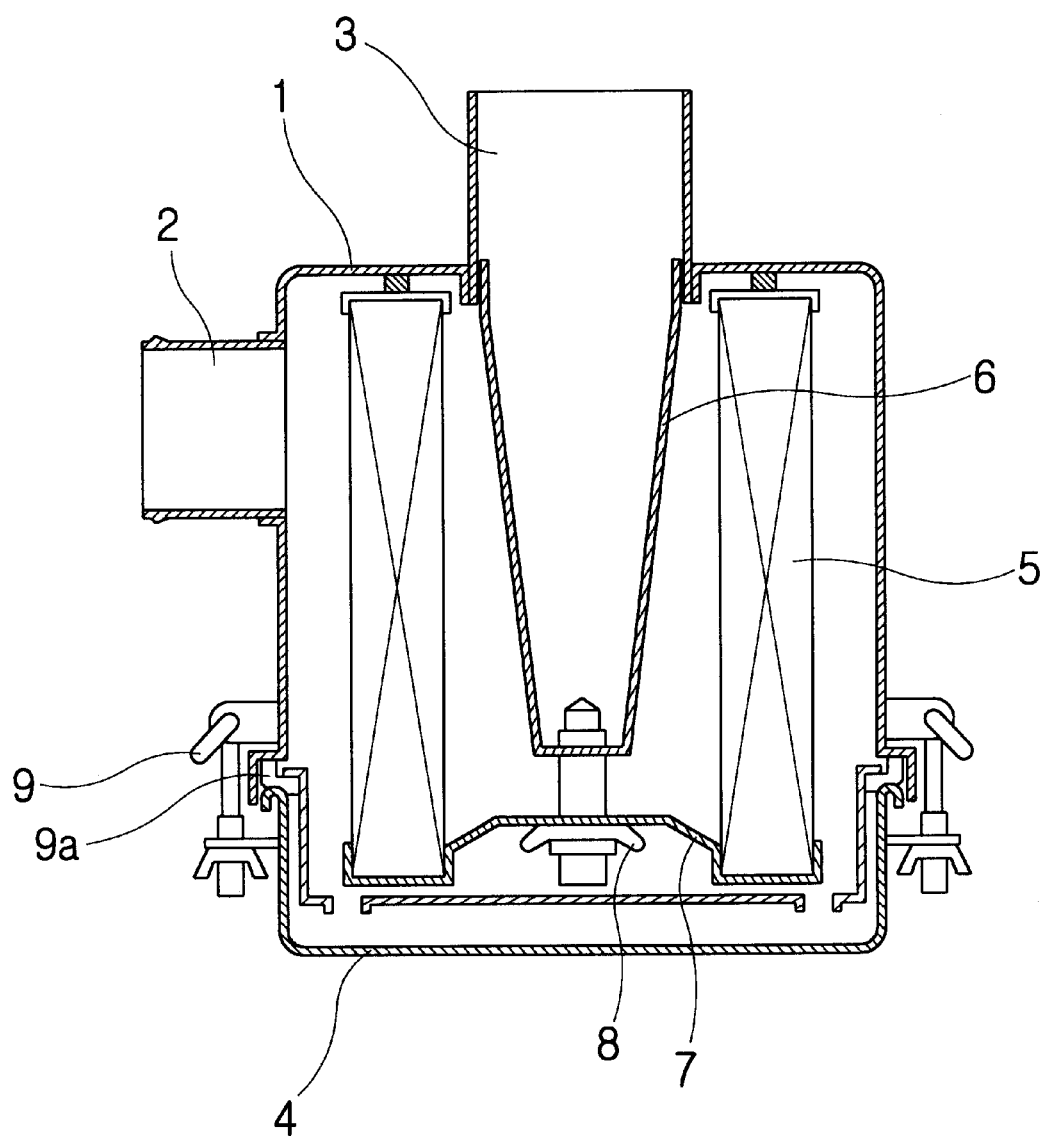
FIG. 1 is a cross sectional view showing a conventional air filter.
Figure 2:
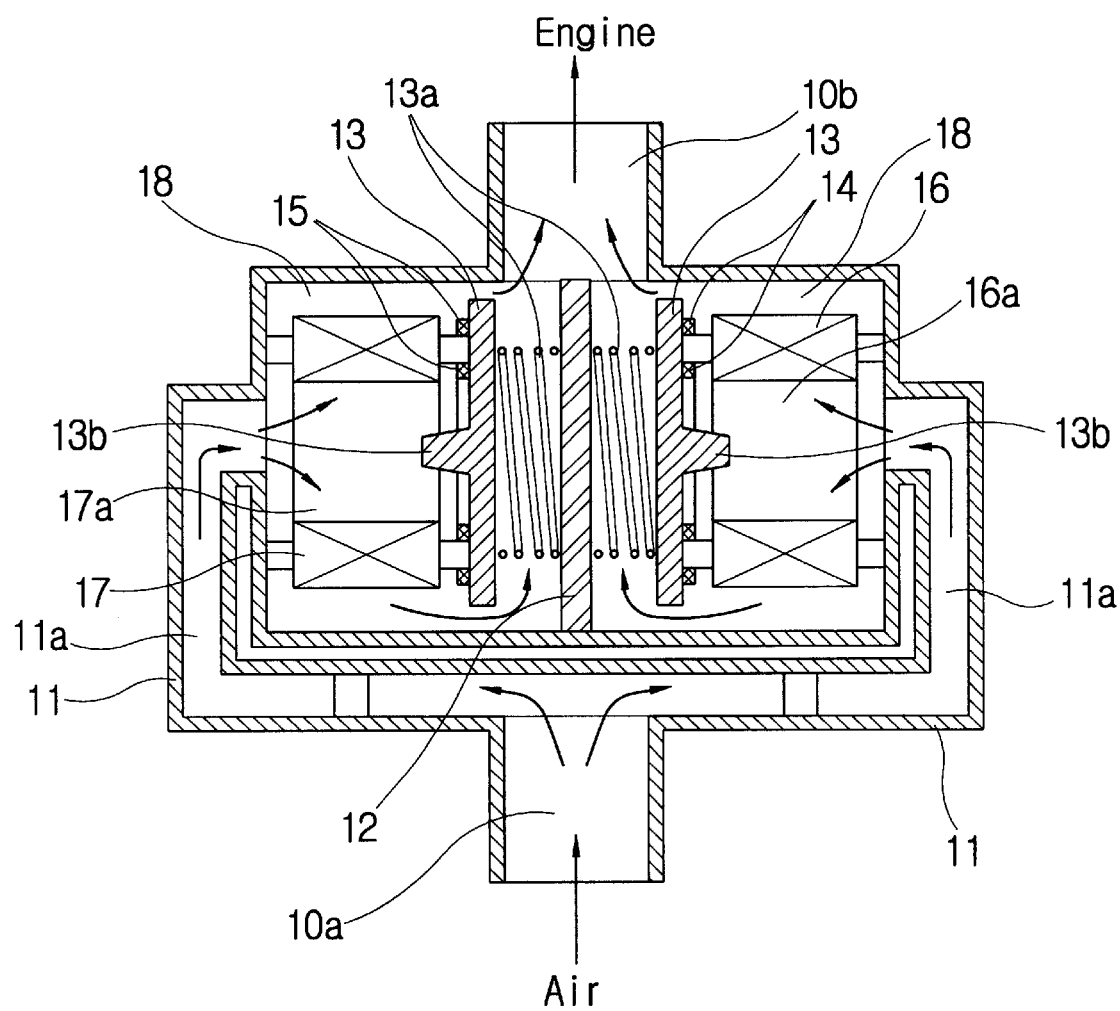
FIG. 2 is a cross sectional view showing the air filter of the present invention.
Figure 3:
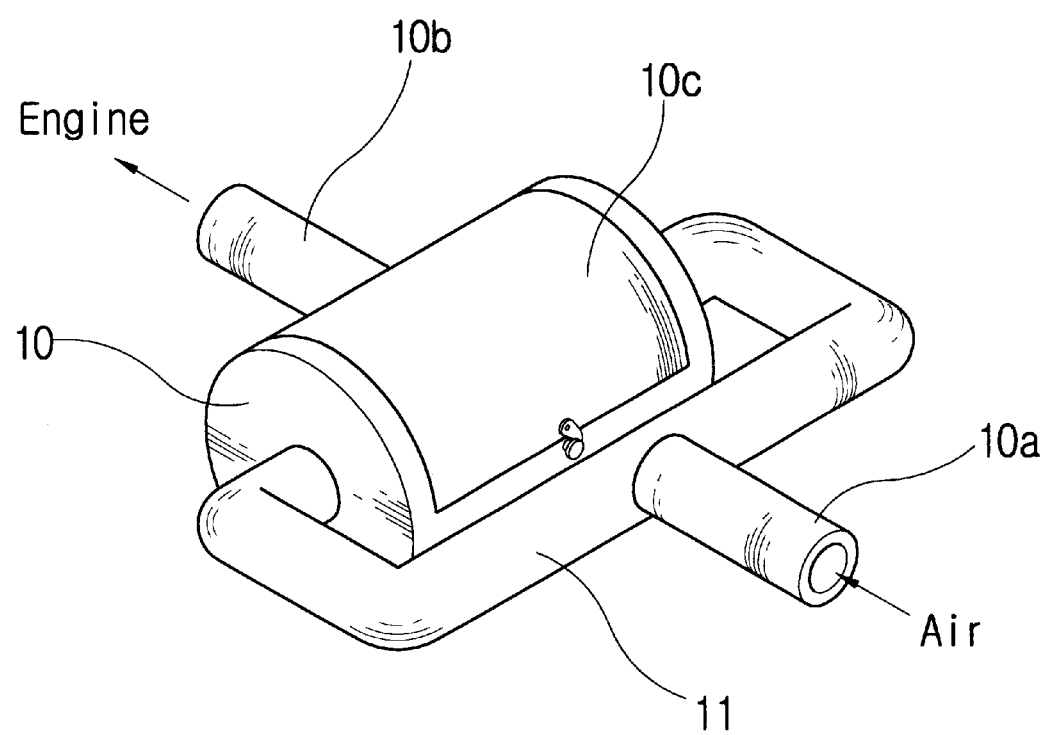
FIG. 3 is a perspective view showing the air filter of the present invention.

Hereinafter, a preferred embodiment of the present invention will be described in more detail with reference to FIG. 2 of the accompanying drawings.

According to the drawings, the present invention comprises roughly a main body 10, guide tubes 11, a baffle 12, supporting and partitioning plates 13, and first and second filter members 16, 17.

The main body 10 forms the total external shape of the air filter, and is formed with a cylindrical shape, and a discharging outlet 10b for discharging clean air to the engine is formed at one side of its circumferential surface.

The guide tubes 11 guide exterior air introduced through an air inlet 10a to both ends of the main body 10. Thus, the air inlet branches into guide tubes which are coupled to opposite sides of the main body 10.

The baffle 12 is a disc member which divides the interior space of the main body into two parts, both parts communicating with the discharge outlet 106.

Thus, the air introduced through the air inlet 10a is divided into two parts and is fed to both ends (opposite ends) of the main body 10.

The supporting and partitioning plates 13 are coupled with first and second filter members 16, 17 respectively. The supporting and partitioning plates are in a state of being urged by springs 13a. The springs are attached to opposite surfaces of the baffle 12. Guiders 13b formed on the supporting and partitioning plates are provided with outwardly inclined surfaces which externally protrude from the respective centers thereof so that the air moving through the flowing paths 11a of the guide tubes are effectively dispersed to the filter members 16, 17 by the guiders 13b.

The spring 13a maintained in a compressed state is fixed on one side to the baffle 12 and on the other side to the supporting and partitioning plate 13. The diameter of the supporting and partitioning plates 13 are smaller than the inner diameter of the main body 10 and are concentrically positioned with respect to the baffle. A space 18 is provided within the main body 10, whereby air introduced to center core portions 16a, 17a is cleaned by passing through the filter members 16, 17 and then fed to engine through the space 18 and the discharging outlet 10b.

And, first and second assembling protrusions 14, 15 each forming a pair of two protrusions are provided at a predetermined distance and in a circular shape at the supporting and partitioning plate 13.

The first and second filter members 16, 17 filter foreign material contained within the air, and each filter member 16, 17 is inserted into the first and second assembling protrusion 14, 15 formed on the supporting and partitioning plate 13. Thus, the filter members 16, 17 are fixed to the wall surface of the main body 10 and to each assembling protrusion 14, 15.

Since the supporting and partitioning plates 13 are urged by the spring 13a provided between the baffle 12 and the supporting and partitioning plates, the first and second filter members 16, 17 are fixed between the supporting and partitioning plates 13 and the main body 10, and the core portions 16a, 17a of the filter members and the space 18 are partitioned by the first and second filter members 16, 17, respectively.

In order to make an easy exchange of the filter members 16, 17, it is desirable to provide an opening door 10c on external circumferential surface. In the case of exchanging the filter members 16, 17, when the supporting and partitioning plate 13 is pushed against the baffle 12 when the door 10c is opened, the supporting and partitioning plate 13 can be moved by compressing the spring 13a so that the filter members 16, 17 can be removed from the assembling protrusions 14, 15 and taken out from the main body 10 and exchanged with new ones.

The operation and effect of the present invention can be described as follows.

When an engine is driven and exterior air is introduced through the air inlet 10a, the air is divided into two parts by the guide tubes 11, the air divided and moving through the guide tubes 11 is directed to the core portions 16a, 17a at both ends of the main body 10 and simultaneously directed to the filter members 16, 17 aided by the guider 13b.

Foreign material present in the air is removed as it passes through the first and second filter members 16, 17, whereby clean air is fed to the engine through the discharging outlet 10b.

As explained in the above description, the air is guided through the guide tubes 11 and through the first filter member 16 and second filter member 17 at both sides of the main body 10 and around the baffle 12 to the engine. Although foreign material in the air is removed by the two filter members, the phenomenon does not occur whereby the filter members become locally polluted, and thus the filtering effectiveness is substantially improved, including the quantity of clean air to be fed to the engine.

Since the present invention utilizes two filtering members which are provided to the right and left of the main interior body, air introduced from the exterior is filtered by dividing the flow to the two filtering members, whereby a much higher quantity of clean air can be supplied to the engine, which improves the capacity of the engine.

What is claimed is:

1. An air filter for vehicles comprising:

a cylindrical main body which is formed on its circumferential surface with a discharging outlet for discharging clean air to an engine;

guide tubes having a common air inlet for introducing air to both sides of the main body;

a disc-type baffle fixed to the main body so as to divide the interior of the main body, including the discharging outlet, into two parts;

supporting and partitioning plates provided at a predetermined distance from both sides of the disc type baffle and having a smaller diameter than the inner diameter of the cylinder of the main body and provided to maintain concentricity with the cylinder of the main body;

springs in a compressed state disposed between the disc-type baffle and the supporting and partitioning plate, said springs being fixed to the disc-type baffle and the supporting and partitioning plate and first and second filter members fixed to the exterior of the supporting and partitioning plates, said first and second filter members having open center cores which communicate with the respective guide tubes, said first and second filter members being concentrically provided within the respective parts of the main body and partitioned with a space formed between the inner wall surface of the main body.

2. The air filter for vehicles as defined in claim 1, wherein a guider for guiding air introduced to the core of the filter members from the guide tubes extends from the supporting and partitioning plate toward the open center core.

3. An air filter for vehicles which comprises:

a main body defining a chamber;

a discharge outlet communicating with said chamber for discharging clean air therefrom;

a disc-type baffle positioned to divide the chamber and the discharge outlet into two filtering zones;

supporting and positioning plates spring-mounted to opposite sides of the disc-type baffle, said supporting and positioning plates having a smaller dimension than the chamber;

an air inlet which branches into separate guide tubes which communicate with the two filtering zones of the chamber and filter elements mounted on each of said supporting and partitioning plates and spaced apart from the walls of the chamber within the filtering zones, said filter elements defining an open center core for receiving air from said guide tubes.

4. The air filter of claim 3 wherein the filtering means have a circular configuration.

* * * * *